US012734452B2

(12) United States Patent
Martin et al.

(10) Patent No.: US 12,734,452 B2
(45) Date of Patent: Sep. 15, 2026

(54) INTERACTIVE TRIVIA

(71) Applicant: Atmosphere.tv, Austin, TX (US)

(72) Inventors: Justin Martin, Austin, TX (US); Leo Resig, Austin, TX (US); Jeffrey C. DiTullio, Austin, TX (US); Haley Bubley, Austin, TX (US)

(73) Assignee: Atmosphere.tv, Austin, TX (US)

(*) Notice: Subject to any disclaimer, the term of this patent is extended or adjusted under 35 U.S.C. 154(b) by 225 days.

(21) Appl. No.: 18/609,243

(22) Filed: Mar. 19, 2024

(65) Prior Publication Data

US 2025/0296002 A1 Sep. 25, 2025

(51) Int. Cl.
*A63F 13/822* (2014.01)
*A63F 13/44* (2014.01)
*A63F 13/46* (2014.01)
*A63F 13/48* (2014.01)

(52) U.S. Cl.
CPC ............ *A63F 13/822* (2014.09); *A63F 13/44* (2014.09); *A63F 13/46* (2014.09); *A63F 13/48* (2014.09)

(58) Field of Classification Search
CPC ........ A63F 13/822; A63F 13/46; A63F 13/48; A63F 13/44
USPC .............................................................. 463/9
See application file for complete search history.

(56) References Cited

U.S. PATENT DOCUMENTS 7,169,050 B1 * 1/2007 Tyler ....................... A63F 13/30 463/29
11,451,883 B2 * 9/2022 Huske ................ H04N 21/8173
11,551,529 B2 * 1/2023 Lockton ................ A63F 13/335
2005/0098955 A1 * 5/2005 Rasmussen ............. G07F 17/32 273/430
2009/0275411 A1 * 11/2009 Kisenwether .......... G06Q 10/10 463/43
2013/0046893 A1 * 2/2013 Hauser .................. G06F 9/4856 709/226
2018/0144590 A1 * 5/2018 Mixter .................... G10L 15/22
2018/0357682 A1 * 12/2018 Jackson, III .......... G06F 16/958

(Continued)

FOREIGN PATENT DOCUMENTS

WO WO-2023212113 A1 * 11/2023 ......... G06F 16/9554

OTHER PUBLICATIONS

Â¢ Metzger et al. âAn Introduction to Online Video Game QoS and QoE Influencing Factorsâ, IEEE Communications Surveys and Tutorials, vol. 24, No. 3, Third Quarter 2022, Aug. 21, 2022, pp. 1894-1925 (Year: 2022).*

(Continued)

*Primary Examiner* — James D Nigh

(57) ABSTRACT

Systems and methods are disclosed for implementing an interactive trivia game among remotely distributed player devices. In certain embodiments, a method may comprise implementing an interactive trivia game at a trivia service, including establishing a persistent network connection with a plurality of remote player devices participating in the interactive trivia game, and issuing trivia game events to the plurality of remote player devices simultaneously based on a local timing manager of the trivia service and a schedule of trivia events. Implementing the interactive trivia game may further comprise verifying scores for the plurality of remote player devices based on the local timing manager, enabling synchronized play of the interactive trivia game by the plurality of remote player devices.

20 Claims, 4 Drawing Sheets

(56) References Cited

U.S. PATENT DOCUMENTS

| | | | | |
|---|---|---|---|---|
| 2021/0373979 | A1* | 12/2021 | Lewin | G06F 16/95 |
| 2022/0036692 | A1* | 2/2022 | Gupta | G07F 17/3223 |
| 2023/0277933 | A1* | 9/2023 | Bijarbooneh | A63F 13/35 463/31 |
| 2024/0404348 | A1* | 12/2024 | Cleveland | G07F 17/322 |

OTHER PUBLICATIONS

Â¢ A Cron Expressions retrieved from https://docs.oracle.com/cd/E12058_01/doc/doc.1014/e12030/cron_expressions.htm, 2009, 2 pages (Year: 2009).*

Â¢ âWhat is WebSocket? How Does it Work?a, retrieved from https://web.archive.org/web/20231223114122/https://gcore.com/learning/what-is-websocket, Dec. 23, 2023, 13 pages (Year: 2023).*

Metzger et al. An Introduction to Online Video Game QoS and QoE Influencing Factors, IEEE Communications Surveys and Tutorials, vol. 24, No. 3, Third Quarter 2022, Aug. 21, 2022, pp. 1894-1925 (Year: 2022).*

A Cron Expressions retrieved from https://docs.oracle.com/cd/E12058_01/doc/doc.1014/e12030/cron_expressions.htm, 2009, 2 pages (Year: 2009).*

What is WebSocket? How Does it Work?, retrieved from https://web.archive.org/web/20231223114122/https://gcore.com/learning/what-is-websocket, Dec. 23, 2023, 13 pages (Year: 2023).*

* cited by examiner

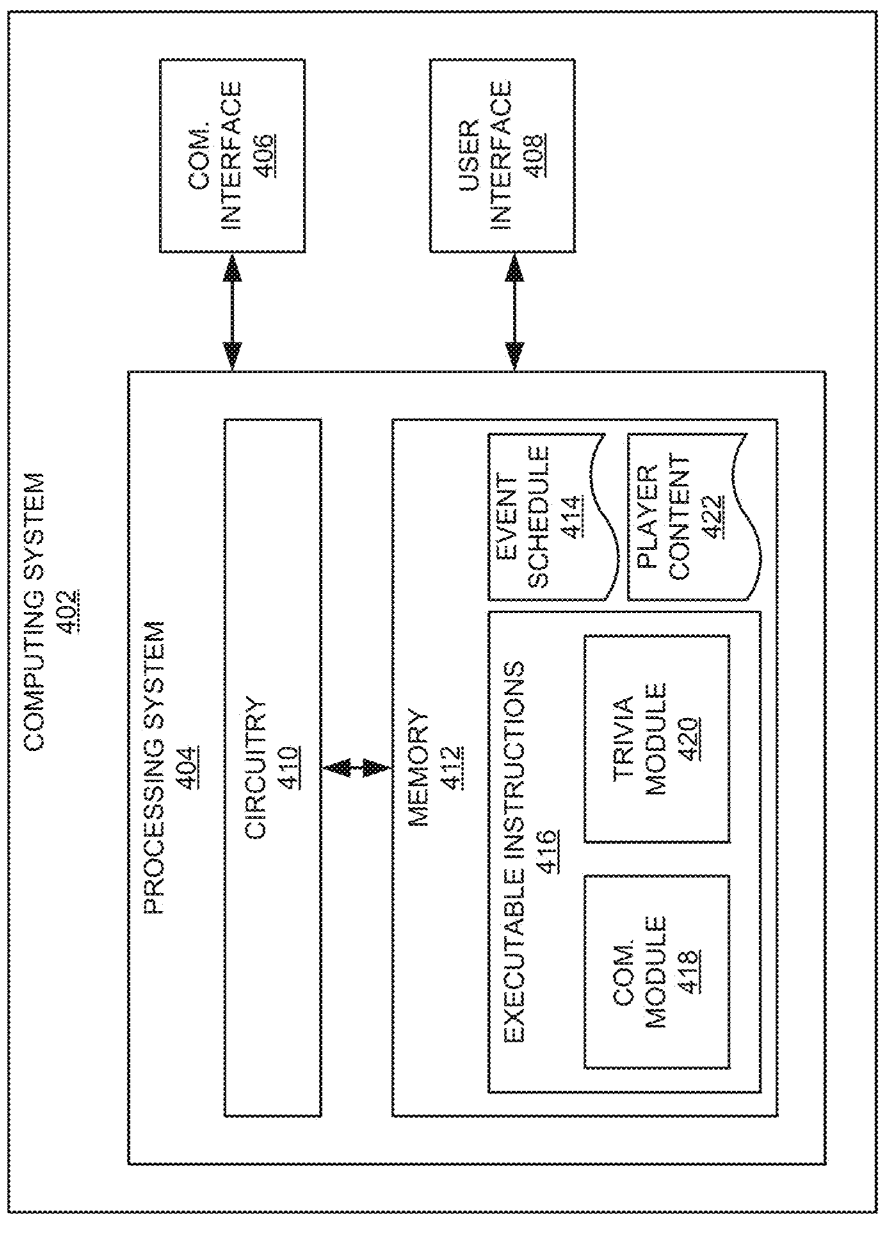
FIG. 4

INTERACTIVE TRIVIA

SUMMARY

In certain embodiments, a method may comprise implementing an interactive trivia game at a trivia service, including establishing a persistent network connection with a plurality of remote player devices participating in the interactive trivia game, and issuing trivia game events to the plurality of remote player devices simultaneously based on a local timing manager of the trivia service and a schedule of trivia events. Implementing the interactive trivia game may further comprise verifying scores for the plurality of remote player devices based on the local timing manager, enabling synchronized play of the interactive trivia game by the plurality of remote player devices.

In certain embodiments, a computer-readable storage medium may store instructions that, when executed, cause a processor to perform a method comprising implementing an interactive trivia game at a trivia service, including establishing a persistent network connection with a plurality of remote player devices participating in the interactive trivia game, and issuing trivia game events to the plurality of remote player devices simultaneously based on a local timing manager of the trivia service, and a schedule of trivia events. Implementing the interactive trivia game may further include verifying scores for the plurality of remote player devices based on the local timing manager, enabling synchronized play of the interactive trivia game by the plurality of remote player devices.

In certain embodiments, a system may comprise a trivia service configured to implement an interactive trivia game, including establish a persistent network connection with a plurality of remote player devices participating in the interactive trivia game, and issue trivia game events to the plurality of remote player devices simultaneously based on a local timing manager of the trivia service, and a schedule of trivia events. The trivia synchronizer may further verify scores for the plurality of remote player devices based on the local timing manager, enabling synchronized play of the interactive trivia game by the plurality of remote player devices.

BRIEF DESCRIPTION OF THE DRAWINGS

FIG. 4 is a diagram of a system configured to implement interactive trivia, in accordance with certain embodiments of the present disclosure.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
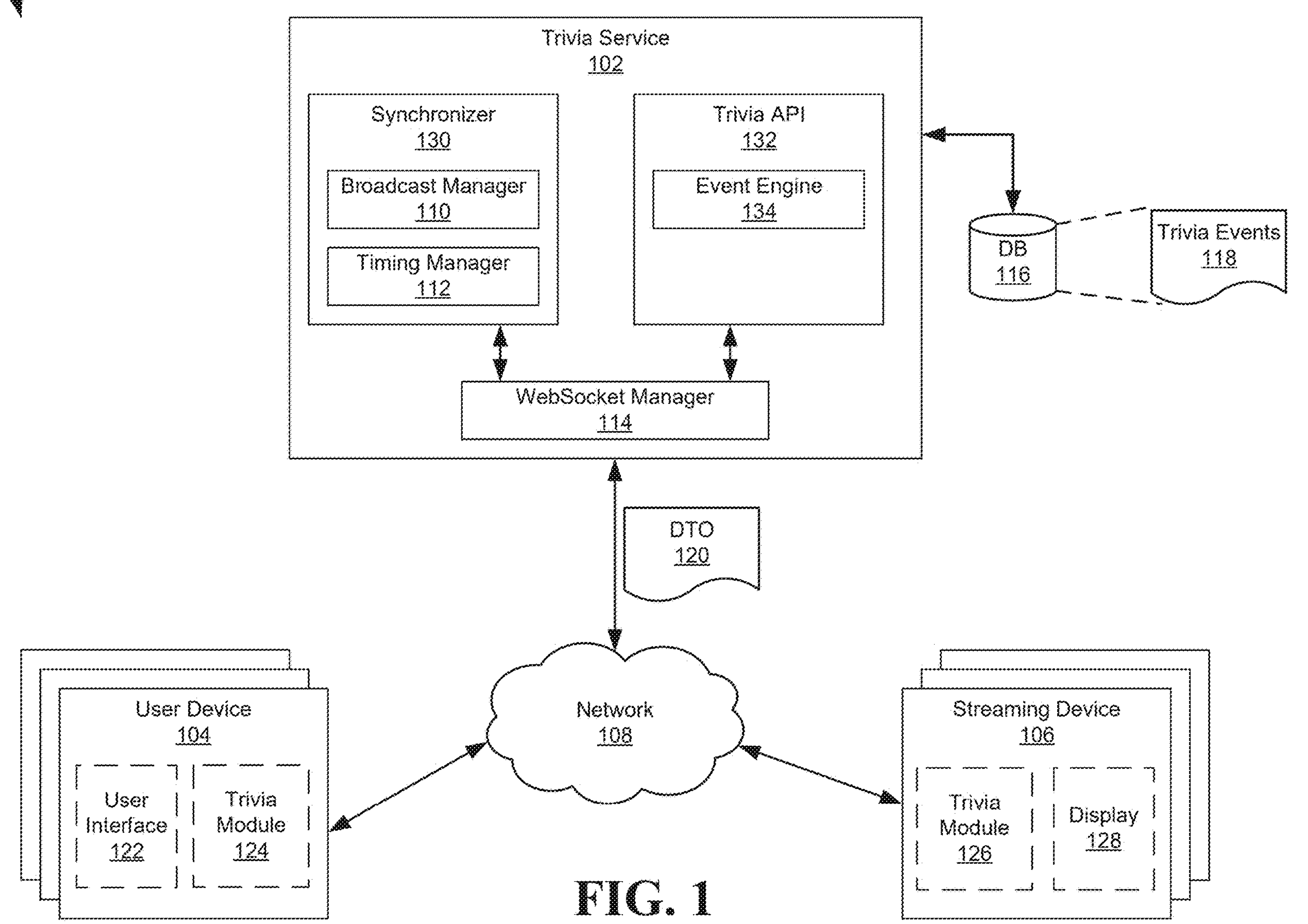
FIG. 1 is a diagram of a system configured to implement interactive trivia, in accordance with certain embodiments of the present disclosure.

FIG. 1 depicts a diagram of a system 100 configured to implement interactive trivia, in accordance with certain embodiments of the present disclosure. In particular, FIG. 1 depicts an example trivia system 100 for implementing a shared online interactive trivia game. Via trivia system 100, trivia participants may participate in the same game, seeing the same questions at the same time, from any internet-connected location in the world. The trivia system 100 may include a trivia service 102, one or more user devices 104, one or more streaming devices 106, and a network 108. Each or any of trivia service 102, user device 104, streaming device 106, and network 108 may be implemented via computers, servers, hardware and software modules, or other system components. Further, trivia service 102 may include or have access to a database (DB) or storage system 116. DB 116 may include one or more data storage devices, data storage mediums, data storage servers, and related data structures, and may store information about trivia service 102, user device 104, streaming device 106, trivia events 118, or other information.

The trivia service 102 may be configured to run an interactive trivia game, which participants may engage with via user device 104, streaming device 106, or other components. The interactive trivia game may be conducted remotely online via network 108, so that participants may be distributed across large geographical distances. In some embodiments, answers or other inputs submitted by participants may be scored or evaluated based on how quickly the participants provide their inputs. For example, each question may have an associated timer within which an answer must be submitted, and the sooner a correct answer is submitted, the more points a participant may receive. As participants race to submit answers quickly to maximize their scores, it may be important that all participants are synchronized for receiving the questions and submitting their answers. In order to execute the trivia game, trivia service 102 may include a synchronizer 130, a trivia API (application programming interface) 132, and a WebSocket manager 114. In some examples, components such as synchronizer 130 and trivia API 132 may be hosted on different servers and located remotely from each other, and may each have their own instance of a WebSocket manager 114.

Synchronizer 130 may be configured to synchronize the interactive trivia game among participants to ensure each participant has a fair and equal opportunity to win. Additionally, the trivia synchronizer 102 may need to ensure that participants are not cheating by manipulating their own devices, such as by adjusting their device clocks to make it appear that answers were submitted more quickly than they were. To facilitate the synchronization of the interactive trivia game, the trivia synchronizer may include a broadcast manager 110 and a timing manager 112, and may utilize a WebSocket manager 114. The proposed synchronizer 130 of trivia service 102 may provide more reliability and security oversight than relying on the internal clocks of user devices 104 or streaming devices 106.

The timing manager 112 may be configured to manage a persistent clock or timing system for running the interactive trivia game. For example, the clock from the timing manager 112 may be used to determine when to start or end trivia games or rounds, or when to send out trivia game messages or indicators to participant devices. In an example implementation, the timing manager 112 may be implemented via system-level "cron jobs". The cron command-line utility may be a job scheduler on Unix-like operating systems. The cron utility may be used to schedule jobs (e.g., commands or shell scripts), also known as cron jobs, to run periodically at fixed times, dates, or intervals. The timing manager 112 may, for example, tick off once per second (or half second, or millisecond, etc.) continually, twenty-four hours a day, seven days a week, telling the broadcast manager 110 that it is time to check for a new trivia event from a schedule of trivia events 118. Accordingly, the interactive trivia game may run based on a universal clock maintained by the trivia synchronizer 102, rather than internal clocks of individual participant devices 104 or 106.

Broadcast manager 110 may be configured to manage the flow of the interactive trivia game. The broadcast manager 110 may be an application-level software module that accesses a file or data for trivia events 118 via a database 116 to determine a next operation to perform in operating the trivia game.

Upon receiving a tick message from the timing manager 112, the broadcast manager 110 may query the database 116 to check if it needs to broadcast a new event, according to a trivia event schedule 118. In some examples, the synchronizer 130 may manage broadcasting of "top-level" trivia events that operate according to a fixed event schedule 118, including presenting a next question, a round change (e.g., questions may be presented in sets comprising a round, within which the questions may share a theme or topic), a leaderboard update or display (e.g., scores listed for each team on a leaderboard may be updated after every question, or after a round, or at other increments, and may be shared to participant devices), content breaks or ad breaks (e.g., when non-trivia content may be shown between questions or rounds), or other trivia game events. If sufficient time has passed since the previous event, the broadcast manager 110 may determine the next needed trivia game event in the game loop, build a data transfer object (DTO) 120 containing all relevant information, and broadcast the DTO 120 to all subscribed devices 104 and 106. All devices should receive the broadcast at nearly the same time, and can begin acting upon that information immediately, regardless of what their internal clock says. This may allow synchronizer 130 to maintain synchronicity among all devices 104 and 106.

Meanwhile, trivia API 132 may be configured to manage dynamic events within a trivia game that may fall outside of the clock tick-based top-level fixed-schedule events managed by synchronizer 130. For example, trivia API 132 may be configured to receive user responses to trivia questions, apportion points, handle interactions between players, determine whether special events are occurring (e.g., player rivalries, streaks, etc.), and so on. The trivia API 132 may also handle device or player authentication (e.g., for user device 104 and streaming device 106), user profiles, configuration settings, player or team names, player or team avatars or icons, play or point histories, and other details. The trivia API 132 may utilize DB 116 to store various player and game data, and to access the trivia events schedule 118 to know when to perform various checks or operations, such as to know if it needs to recalculate the leaderboards, or if a received player answer is a valid event (e.g., answering a question that happened a few events ago is invalid, for example). In an example, synchronizer 130 may issue a top-level event to participant devices indicating the devices should transition to a leaderboard screen. In response, the participant devices may request, from trivia API 132, the specific leaderboards for the appropriate trivia game or venue at which the participants are located.

Within the trivia API 132, there may be a component called the event engine 134, which identifies key in-game special events, such as streaks, player rivalries, etc. Based on detected events, the event engine 134 may display player avatars celebrating, congratulatory animations, teasing messages, or other events. The depicted events may be displayed to all players (or all players at a particular venue), for example based on the trivia API 132 sending a DTO 120.

In some examples different DTOs 120 may be sent to different participant devices 104 and 106, or different devices may be configured to act upon the same DTOs in different ways. For example, streaming device 106 may include a streaming TV device that can tune into a trivia channel, thereby connecting to trivia service 102. The streaming device 106 may display each question and potential answer, but may optionally be passive and not receive user answers to send back to the trivia API 132. The streaming device 106 may display a passcode, QR (quick response) code, web link, or other element that can be used at user device 104 to enable a participant to join in the trivia game and actively participate via the user device 104. The streaming device 106 may optionally also present graphical flourishes, such as clashes between avatars for rival teams in the trivia game, graphical representations of hot streaks or cold streaks for a particular team or group, or other elements that may not be depicted on user devices 104. Meanwhile, user devices 104 may be associated with a particular player or team, and may be updated with that particular participant's score, details, or other interactive elements that may not be shown on the streaming device 106. As an example, participants may be able to use "strats" or interactive elements to sabotage other teams or give themselves an advantage. Sabotaging events may be sent by a sabotaging user device 104 to trivia API 132, which may in turn create a DTO 120 sending the sabotage event to the target user device 104. Accordingly, trivia service 102 may send different DTOs 120 to different devices 104 and 106, which may include elements specific to user devices 104 (or to a particular user device 104 of a specific team or player) and elements specific to passive streaming devices 106. In another example, the same DTOs 120 may be sent to all participant devices, but different devices may be configured to act or not act upon different information within the DTO.

The WebSocket manager 114 may be configured to manage the network connections between trivia service 102 and participant devices, such as user devices 104 and streaming devices 106. With standard internet web requests (e.g., HTTPS messages via TCP/IP), a client opens a connection to a host, makes a request, receives a response, and then the connection is closed. Conversely, a WebSocket connection may remain open indefinitely. The WebSocket API may be an advanced technology that makes it possible to open a two-way interactive communication session between a user's browser and a host server. Using the WebSocket API, a client can send messages to a server and receive event-driven responses without having to poll the server for a reply. Both synchronizer 130 and trivia API 132 may utilize WebSocket connections with participant devices during a trivia game.

The synchronizer 130 or trivia API 132, via WebSocket manager 114, may act as a centralized host that operates at a known or fixed IP (internet protocol) address, and may maintain a persistent presence such that any potential trivia participant is always able to connect. Client devices, such as user devices 104 (e.g., iOS or Android® smartphones running a trivia app) or streaming devices 106 (e.g., Android TV® or tvOS® streaming televisions) may be provided with an address and keys required to open a connection to one or more persistent WebSocket connections via WebSocket manager 114. By opening a connection to synchronizer 130 and trivia API 132 via WebSocket connections, a client device 104 may join in as a participant of the interactive trivia game. When the device joins the interactive trivia game, whether by a TV navigating to a trivia channel hosted by the trivia synchronizer 102 or the mobile app entering a join code, the device will open one or more connections to the trivia service 102 and begin listening for trivia game traffic or messages issued from the synchronizer 130 or trivia API 132, which traffic may drive the user interface (UI) at the user device 104 or streaming device 106. If the device loses its internet connection, or the socket connection with the WebSocket manager 114 closes, participant devices may automatically begin reconnecting. Accordingly, the WebSocket manager 114 may maintain the connections with all participant devices 104 and 106, and coordinate and manage traffic to and from the devices 104 and 106, such as to ensure the proper trivia game traffic is sent to the correct participant device, and that traffic received from each participant device is properly associated with the correct participant.

In an example embodiment, trivia service 102 may utilize two or more different types or channels of WebSocket connections. For example, when a user device 104 scans a QR code or uses an app to join a trivia game hosted by trivia service 102, the user device may be directed to establish a set of WebSocket connections to fixed addresses. A global WebSocket channel may connect a user device 104 to the synchronizer 130, and may be used by the synchronizer to push out top-level game events according to trivia event schedule 118. In addition to the global channel, the trivia service 102 may support one or more venue-specific or game-specific WebSocket channels. A venue-specific channel may apply when all players within a particular restaurant or bar are presented with a same join QR code (e.g., via streaming device 106 located at the venue), and compete against each other. A game-specific channel may apply when players from multiple locations are competing against each other in a same trivia game. In either event, the specific channels may be utilized by trivia API 132 for sabotage events between players, to display rivalries in point totals, join game messages, or to broadcast user responses for the appropriate venue or game. When a user device 104 or streaming device 106 joins a game, the device may establish both a global WebSocket connection and one or more specific WebSocket connections to trivia service 102, to receive different types of messages, events, or notifications.

In some examples, the WebSocket connections, once established from user device 104 or streaming device 106 to trivia service 102 via WebSocket manager 114, may be used to push events and other traffic from trivia service 102 to participant devices. Conversely, user devices 104 may send their messages to the trivia service 102 or trivia API 132 via standard HTTPS web requests (TCP/IP), rather than via WebSocket channels. In some examples, this may allow trivia API 132 to more easily keep responses and messages from different participants separate.

As discussed above, user device 104 may comprise a network 108-connected computing device used to actively participate in interactive trivia games. For example, user device 104 may include a smart phone, tablet, laptop device, or other computing device that may receive trivia game events from trivia service 102, display questions and potential answers, and receive user input to select answers to participate in the trivia game. Accordingly, user device 104 may include a user interface (UI) element 122, and a trivia module 124.

User interface 122 may include user input elements of the user device 104 (e.g., touch screen, keyboard, pointer device, or other physical input components), as well as a graphical user interface (GUI) showing a user the trivia game interface, and other feedback elements such as sound effects and music. For example, the user interface 122 may include the graphical depiction of the interactive trivia game, including displayed questions, scores, answer options, menus and buttons to adjust settings and provide input, and other user interface elements. User interface 122 may work in conjunction with trivia module 124 to display game events and to receive and transmit user input.

Trivia module 124 may include an app or other program including executable instructions for participating in the interactive trivia game via user device 104. For example, trivia module 124 may be configured to open one or more WebSocket connections to trivia service 102 via network 108. The trivia module may be configured to receive DTOs 120 including trivia game event data via the persistent WebSocket connections, and unpack the DTOs. A DTO may be configured to include minimal data in a structured format to keep the message size small, helping to ensure that the messages can be received at participant devices 104 and 106 reliably and quickly. Accordingly, the trivia module 124 may be configured to read the DTO 120 and react to the minimal information to implement the trivia game events at the user device 104. The trivia module 124 may include pre-configured animations, graphics, sound effects, and other trivia game elements that can be activated based on minimal DTO 120 data. The trivia module 124 may implement the game flow and trivia events via user interface 122.

As an example, the trivia module 124 may be configured to receive a DTO that includes the text for a question and four possible answers. Trivia module 124 may be configured to generate a graphical depiction of the question and answers on the UI 122 according to a pre-configured template. Trivia module 124 may also be configured to automatically implement a ten-second timer for each question, represented by a countdown bar or clock on the UI 122. The amount of points a user earns for a correct answer may depend on how quickly they input their answer within the ten second window. The trivia module may determine a point value for the answer based on the user device 104 internal clock, and may generate and send a data packet back to trivia service 102 with the internally calculated score (or an answer time stamp and the submitted answer, for embodiments where correct answers are evaluated at the trivia service 102, e.g., via trivia API 132). Trivia API 132 may compare the received timestamp or score value, and may compare it against the time since the question was sent out to determine whether the timestamp is likely valid before tallying the user's score. In some examples, trivia module 124 may also be configured to implement various sabotage events or similar events received in the DTO 120.

Trivia module 124 may be configured to receive user inputs via the user interface 122, and generate data messages or indicators to send to trivia API 132. The inputs may include answer selections, which may be sent to trivia API 132 along with a timestamp of the answer relative to the question timer (or alternately, the trivia module 124 may know the correct answer and may calculate a score to return to trivia API 132). In another example, user inputs may include strategies or "strats", which may include special actions that can impact the user's own game performance or the performance of another participant. For example, a sabotage action may invert the question text of another participant, or render them unable to answer for a period of time. Other actions may include implementing a shield against sabotage events, or a way to eliminate one or more incorrect answers from the answer list. Accordingly, the action selected and the target of the action (whether self or another participant) may be converted into a message and sent to trivia API 132. Strat actions may have limited uses, and so the number of remaining uses for each action may be monitored or enforced via trivia service 102.

Similarly, streaming device 106 may comprise a device such as a television, set top box, or other device that streams content for display, such as over the top (OTT) media streamed via network 108 (e.g., the internet). Streaming device 106 may be configured to tune to a streaming channel for the interactive trivia game, including opening one or more WebSocket connections to trivia service 102. In some examples, streaming device 106 may be displayed at a public venue, such as a bar or restaurant, and may display trivia questions for guests of the venue to watch. The streaming device 106 may present an invitation to the join the game, along with a QR code, web address, passcode, or other information that viewers can use to connect a user device 104 to trivia service 102. Streaming devices 106 may be distributed at venues across large geographical regions, including around the world, enabling players to participate in a same trivia game around the world, from different venues. In some embodiments, streaming device 106 may also enable active participation in the trivia game, such as by a user selecting answers with a remote control or other input device. Streaming device 106 may include a trivia module 126 and a display 128.

Trivia module 126 for streaming device 106 may correspond to trivia module 124 for user device 104. In particular, trivia module 126 may be configured to receive DTO 120 messages, and use the information to depict trivia game events such as new questions, question timers, and other events, such as participant hot streaks, participant rivalries, or other events. In some embodiments, the trivia module 126 may be configured to receive user input and send data packets or messages to trivia API 132, for example via a WebSocket or HTTPS connection.

Display 128 may include a combination of physical display components such as a television screen or monitor, and graphical elements such as the trivia game display of questions and other events. In some embodiments, display 128 may be configured to receive user inputs, such as to select answers or other user actions. The display 128 may work in conjunction with trivia module 126 to display game events or to receive and transmit user input.

Trivia API 132 may receive input or feedback from participant devices 104 or 106. Messages from devices 104 or 106 may include information such as participant answer responses, points received by a participant for a question, timestamps the message was sent or user input received, participant or device identifier so that inputs may be associated with an appropriate participant, or other information. In some examples, messages may include an identifier for a particular trivia channel or trivia game in which the device 104 or 106 is participating, a venue or location at which the participant is located, or other information.

Trivia service 102 may analyze the received messages and behave accordingly. For example, participant scores may be evaluated and added to participant point totals. A participant's trivia game details may be stored to DB 116 or other memory, with information such as current score, past trivia game records, location, device ID, available strat actions, or other details.

Between questions or rounds, trivia API 132 (e.g., via event engine 134) may determine whether noteworthy or special events are occurring. Events may be displayed on streaming devices 106, or in some cases on individual user devices 104. Events may be actively triggered or user-generated, such as based on an HTTPS web request sent from a user device 104 to trivia API 132 to execute a strat or sabotage action. Trivia API 132 may listen at a web address for HTTPS web requests, or on the open WebSocket connections, for strat actions, such as sabotage events from one team to another. These actions may be immediately forwarded to a target user device 104, sent along with a next question (e.g., on a DTO 120 to a target device, or to all players with a target ID and sabotage ID for a sabotage action, with only the target user device 104 acting on the action), or at any other selected interval. In other examples, events may be caused by event engine 134 detecting triggers, such as player rivalries (e.g., if two players keep trading a top leaderboard spot), venue rivalries (e.g., based on the overall performance of players at various venues), correct answer streaks, and so on.

When trivia API 132 receives an answer response from a participant, the message may include a timestamp or point total attributed to when a participant submitted their answer. The trivia API 132 may compare the time stamp or point total to a threshold range, based upon when the question DTO 120 was sent to players or when the question was scheduled in the trivia events schedule 118, to evaluate whether the response time or value appears to be legitimate. The threshold range may take into account potential minor delays in network 108 traffic, but be strict enough to prevent cheating or point tampering.

By implementing the trivia service 102 and participant devices 104 and 106, an interactive trivia game may be played by players around the world simultaneously, while maintaining synchronicity and fairness in scoring. An example user interface for an interactive trivia event is depicted in regard to FIG. 2.

Figure 2:
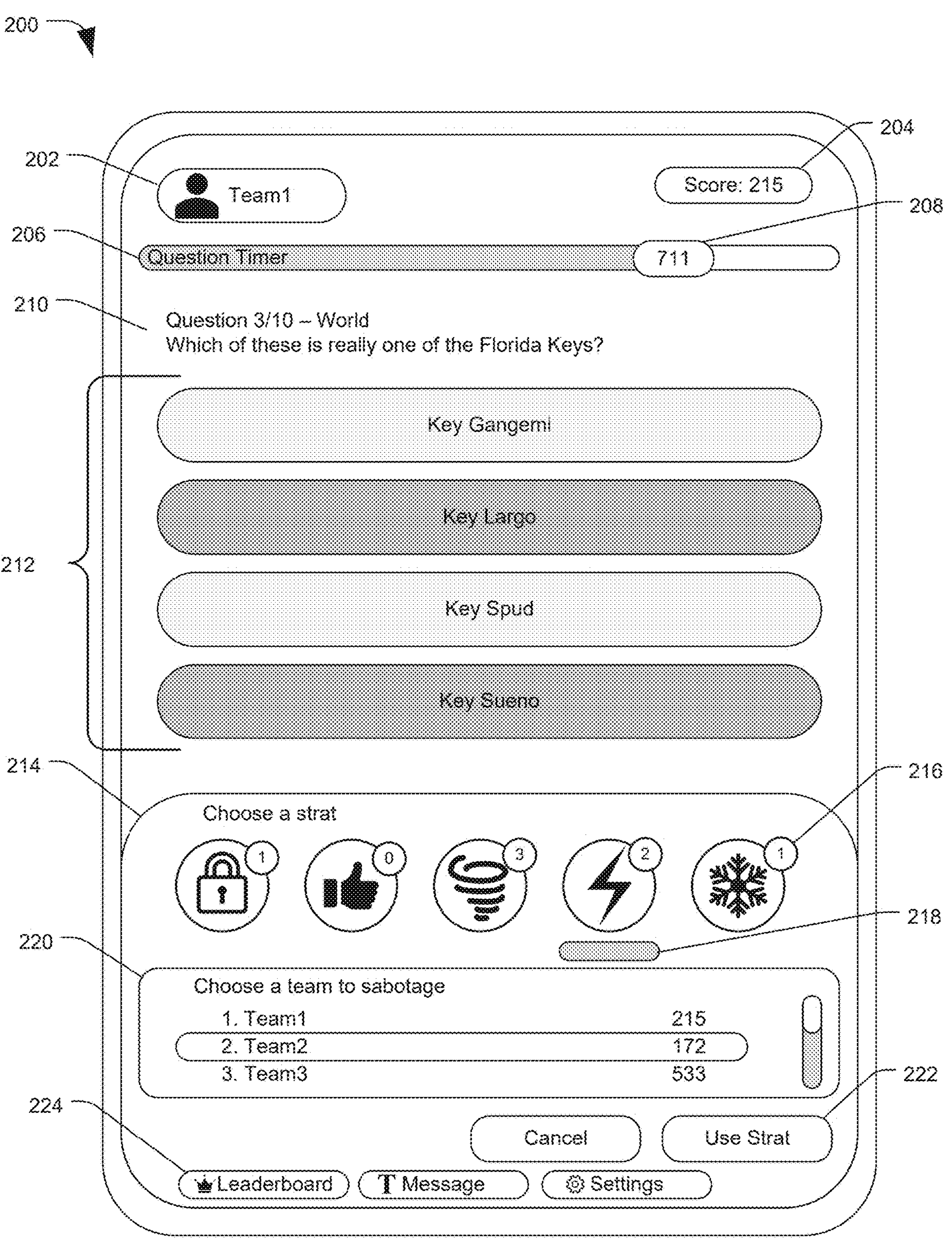
FIG. 2 is a diagram of a system configured to implement interactive trivia, in accordance with certain embodiments of the present disclosure.

FIG. 2 depicts a diagram of a system 200 configured to implement interactive trivia, in accordance with certain embodiments of the present disclosure. In particular, FIG. 2 presents an example embodiment of a user device displaying a user interface for participating in an interactive trivia game, as described herein. System 200 may include a user device, such as user device 104 of FIG. 1, although a similar graphical display may be presented on streaming device 106 of FIG. 1. The depicted interface of system 200 may correspond to user interface 122, and may operate according to a trivia module 124.

A user that wishes to participate in an interactive trivia game may scan a QR code or follow a web address to download a trivia app, or may open a trivia website that provides the interface, or may otherwise access the trivia game. Once the app is opened or the website accessed, a user may enter a code displayed at a venue (e.g., on a streaming device 106) or found elsewhere, which may enable the device 200 to create one or more WebSocket connections to a trivia service 102 and join a particular trivia game. The user device 200 may then depict a trivia game interface similar to that depicted in FIG. 2.

The system 200 may include a team or player name, avatar, or other indicator 202. In some embodiments, players may design their own avatar, which may be provided to the trivia synchronizer and included in various event depictions, including as an animated character celebrating, feuding with other player avatars, and so on. Player names 202 of participants in a game may be visible to other participants (e.g. as part of leaderboard 224 or sabotage player selection menu 220).

The system 200 may also include a score display 204, such as a current personal score for the participant for the current trivia game or round. The score may be calculated in various ways, such as how quickly and accurately the participant responded to previous questions in the game or round.

A question timer 206 may also be included in system 200. The timer 206 may indicate how much time is remaining to answer the current question, and may be represented by a countdown clock, a progress bar, or other indicator. In the depicted example of FIG. 2, a time remaining indicator 208 may move down the question timer bar 206 to show the remaining time. The time remaining indicator 208 may include a score value that decreases as the time runs out, with the score value indicating what score a participant will receive if they submit a correct answer at that time (depicted as 711 in the example). In an example embodiment, the score value for a question may be 1000 when the timer is completely full, and a small value, such as 20, if the question is answered at the last moment.

The current question 210 of the interactive trivia game is also shown in system 200. The question 210 may include a question alone, or may include additional information, such as the current question number and total number of questions in the game or round, a topic or category of the game or round (e.g., 'World' or 'Geography'), or other details (e.g., whether the question awards bonus points). In the depicted example, the current question is, "Which of these is really one of the Florida Keys?"

The possible answers 212 may be depicted along with the current question. Potential answers may be presented as a multiple choice option, where participants select one or more correct answers. In some examples, a user may be invited to type in an answer, select an object or item from a picture or map, or otherwise select their answer. In some examples, incorrect answers may be indicated (e.g., by graying them out), such as due to time on the question timer 206 running down, or from a participant using an appropriate "strat" action 214.

The strat actions 214 of system 200 may include actions a participant may take that can affect the gameplay of the trivia game for themselves or other players. The strat menu 214 may include one or more actions that are available, which are depicted in the current example as various icons within circles. For example, the 'lock' action may protect a player's game against a negative strat or "sabotage" action used by other players. The 'thumbs up' action may be used to eliminate one or more wrong answers from a current or next question for the player. The 'whirlwind' action may invert the next question for a selected target player 220. The 'lightning bolt' action may make a selected target player's 220 screen flash periodically for a set period, which may make it hard to read questions or otherwise use the UI of the trivia game. The 'snowflake' action may freeze a selected player's 220 interface for a period, preventing them from selecting an answer quickly. These are just examples, and other strat and sabotage actions may be included.

Each strat action 214 may have a limited number of uses, as indicated by a number 216 by each action icon. This number of uses may be refreshed at the start of each game, each round, or according to other factors (e.g., number of wrong or right answers submitted, or by paying a fee to unlock more uses). The currently selected action may be indicated by a highlight or other element 218. Once an action 214 is selected 218, a target player menu 220 may show which other players are participating in the interactive trivia game, and may show a player's name, icon, current point total, or other details. A player may select which player to target for the strat action 214 from the target players menu 220. Once an action and target are selected, a player may choose to "use strat" or "cancel" their selection, at 222. Using a strat may consume one of the remaining uses 216, and the action may be sent to a trivia service 102, which may send out a DTO 120 to at least the target player at an appropriate time for the action to be applied at the target player's device.

Figure 3:
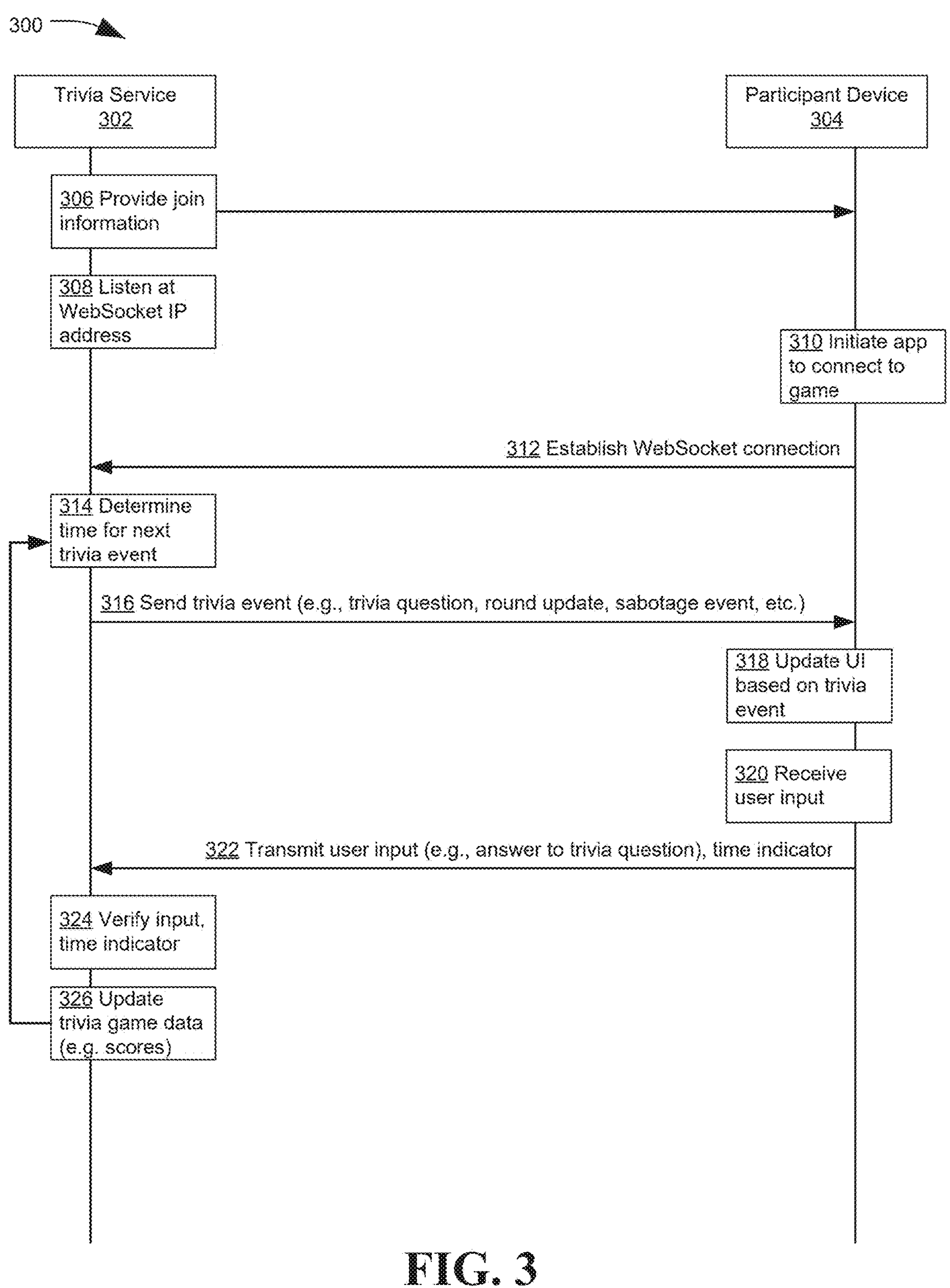
FIG. 3 depicts a process flow of an example method for implementing interactive trivia, in accordance with certain embodiments of the present disclosure.

System 200 may have additional options and features 224, such as a leaderboard, messaging option, or settings menu. The leaderboard may display current or all-time trivia game player scores, such as a top 100 players or teams. The message feature may allow a participant to send a message to another participant, or send a general message that may be displayed to selected groups or all participants (e.g., by being displayed on streaming devices 106 at participating venues, such as all venues or one or more selected venues). A settings menu may allow a participant to adjust various attributes of the trivia game or the UI, such as a light or dark mode, text size, notification settings, volume or sound effects, or other settings. Using the various strat actions, a trivia synchronizer that can detect and display events like hot streaks and rivalries, or both, provides an interactive trivia game where players become engaged with other players in addition to simply answering questions to achieve a high score. Further, the systems described herein allow interaction and engagement of players around the world simultaneously, rather than being limited to the physical venue at which each player is situated. FIG. 3 depicts an example process flow for an interactive trivia game.

FIG. 3 depicts a process flow diagram of a system 300 configured to implement an interactive trivia game, in accordance with certain embodiments of the present disclosure. In particular, FIG. 3 depicts a sequence of operations and data transfers between a trivia service 302 and a participant device 304, which may correspond to trivia service 102 and user device 104 of FIG. 1. In some examples, there may be multiple participant devices 304, and some participant devices may correspond to streaming device 106 of FIG. 1.

At 306, the trivia service 302 may provide join information that may be used by participant devices 304 to join an interactive trivia game. For example, the trivia service may provide a web address, QR code, join code or password, or other joining information on a streaming device, which information can be used on a participant device 304 to access the game. The address or codes may direct a user to where they can download an app to play the game, or may direct an app on a participant device 304 to establish one or more connections with the trivia service 302, or both. If a participant device 304 already has a trivia app or has signed up with the trivia game provider, the trivia service 302 may send join information to the app, to a participant's email address, text the information to a participant's phone number, or otherwise provide the join information. In some examples, the trivia service 302 will continue to display join information on a streaming device or through an app continually or repeatedly even during an ongoing game, so that new players may join at any time.

After providing join information, at 306, the trivia service 302 may listen for one or more new connections at one or more WebSocket IP addresses, at 308. Players may join a trivia game by establishing one or more persistent WebSocket connections at fixed IP addresses for the trivia service 302 using the join information previously provided. For example, the participant device 304 may be directed to create a first WebSocket connection to a global channel to receive top-level game events from a synchronizer 130, and a second WebSocket connection to a venue-specific channel for dynamic events from a trivia API 132.

At 310, the participant device 304 may initiate an app to connect to the game based on the join information. The app may include a specialized app configured to connect to the trivia service 302 and participate in the game, or the app may be a general app such as a web browser used to download a specific app, or to simply play the trivia game through a web app or web page. Using the app, the participant device 304 may establish one or more WebSocket connections with the trivia service 302, at 312. A WebSocket connection may include a persistent connection that allows the trivia service 302 to send notifications or messages to participant device 304 at any time, or vice versa.

The trivia service 302 may determine a time for a next trivia event, at 314. For top-level or global events, s synchronizer 130 of trivia service 302 may include a timing manager 112 and broadcast manager 110 that continually ticks off time and determines a next trivia game event to execute according to a schedule, and may execute the game events at the selected time regardless of a join status of any participant devices 304. As an example, top level or global trivia events may include a new game starting, a new round starting, a next question to ask, a leaderboard display, content or ad breaks, or other global scheduled events. In some examples, trivia game events may also be initiated dynamically, such as by a participant device 304 executing special actions that affect themselves or other players, or based on a trivia API 132 of the trivia service 132 determining that there is a point rivalry occurring between a pair of participant devices, or that a particular participant device is on a noteworthy hot streak or cold streak.

At 316, the trivia service 302 may send out a trivia event, such as a new question, round update, or sabotage event, to one or more participant devices 304. The trivia synchronizer 302 may package the trivia event in a small data packet, such as a data transfer object (DTO) 120, to help ensure it reliably reaches all targeted participant devices, and send the DTO over the appropriate WebSocket connection.

At 318, the participant device 304 may receive the trivia event message, and may be configured to update a UI of the participant device based on the trivia event. For example, a DTO may include a number fixed fields containing values for, e.g., a type of event, a text string (e.g., for a question or message), or similar fields. The participant device 304 may be executing an app or instructions that is pre-configured to execute graphical, sound, or other operations based on the value of the "event" field and update a question or text with the value from the text string field, without receiving more detailed execution instructions from the DTO.

The participant device 304 may receive user input, at 320. The user input may include an answer to the latest question, a selection of a "strat" or sabotage action and corresponding target player, an input message, or other inputs. User inputs may potentially be received at any point in the game cycle, outside of the basic question-answer game cycle. In the case of a user answer to a question, the user input may include a timestamp at which the answer was submitted, a score value for the answer based on, e.g., how quickly the answer was entered or how many correct answers were selected, or both.

The participant device 304 may be configured to convert the user input into a message packet or transmission format recognized by the trivia service 302 (e.g., by trivia API 132), and then transmit the user input to the trivia service 302 over a WebSocket connection or as an HTTPS request. The transmitted user input may include the timestamp, score value, or both calculated at the participant device 304, for example based on an internal clock of the participant device.

At 324, the trivia service 302 may verify the input and the time or score indicator. Verifying the input may include ensuring the message from the participant device 304 could be read and was not corrupted in transmission. Verification may also include checking whether the timestamp or score value submitted by the participant device 304 appears valid according to the trivia service's own timekeeping. For example, If a question was issued to participant devices 304 ten seconds ago, with an expected one second delay for data transfer time in issuing the trivia event and receiving a response transmission, then a response that claimed an answer was entered within the first second may be rejected as being unreliable, while a response indicating an answer was submitted nine seconds after the question was posted may be accepted and validated.

Based on the user input(s), the trivia service 302 (e.g., via trivia API 132) may update the trivia game data (e.g., scores, special action uses remaining, special actions to apply to other players), at 326. The process flow may then return to determining a time for a next trivia event, at 314, and the game flow may proceed from that point. An example system for implementing a trivia game is described in regard to FIG. 4.

FIG. 4 is a diagram of a system 400 configured to implement interactive trivia, in accordance with certain embodiments of the present disclosure. In particular, FIG. 4 depicts a computer system 402, which may be an example of any computing system that may be employed to perform the operations of trivia service 102, user device 104, streaming device 106, and related processes and methods. Computing system 402 may include a processing system 404, a communication interface 406, and a user interface 408. Computing system 402 may include other components, such as a battery and enclosure, that are not shown for clarity. Computing system 402 may comprise one or more server computing systems, desktop computing systems, laptop computing systems, smartphone devices, set-top or streaming boxes, connected televisions, or any other computing system, including combinations thereof.

Communication interface 406 may comprise components that communicate over communication links, such as network cards, ports, radio frequency (RF), processing circuitry and software, or other communication components. Communication interface 406 may be configured to communicate over metallic, wireless, or optical links. Communication interface 406 may be configured to use Time Division Multiplex (TDM), Internet Protocol (IP), Ethernet, optical networking, wireless protocols, communication signaling, other communication formats, or any combinations thereof. Communication interface 406 may also enable communication with local external devices, such as external storage or interface devices.

User interface 408 may comprise components that interact with a user to receive user inputs and to present media or other information. User interface 408 may include a display screen, touch screen, touch pad, keyboard, buttons, speaker, microphone, pointer device or interface, communication port, other user input/output apparatus, or any combination thereof. User interface 408 may also include camera or image capture apparatus for scanning elements such as QR codes. In some examples, user interface 408 may be a module configured to interface with a separate system for presenting information and receiving inputs. For example, computing system 402 may have limited or no direct user input components, but it connects (e.g., via communication interface 406) to a monitor or other device that may receive inputs via touch screen, remote control, or other input method, which inputs are then provided or relayed to computing system 402.

Processing system 404 may be linked to communication interface 406 and user interface 408. Processing system 404 can include processing circuitry 410 and memory device 412. Memory device 412 can store executable instructions or other operating software 416, as well as non-executable data files, such as event schedule 414, and player content 422. Event schedule 414 may include global trivia events that occur at selected time periods or after a selected number of clock ticks or computing periods. Event schedule 414 may also include corresponding data for the trivia events, such as trivia game numbers, round numbers, question numbers, the question text, the category or topic for rounds or trivia games, and other game data. Event schedule 414 may be set by a system administrator or game coordinator, for example via communication interface 406 or user interface 408. Player content 422 may include player or team names, avatars, current game scores, score history, available number of special actions or strats, interaction history (e.g., with other players, answers submitted, etc.), or other player-specific details.

Processing circuitry 410 may comprise a microprocessor and other circuitry that can retrieve and execute instructions 416 from memory device 412. Memory device 412 may comprise a non-volatile data storage medium, such as a disk drive or solid state drive, or volatile memory such as random access memories (RAM) and dynamic RAM (DRAM), or any other memory apparatus. In some examples, processing circuitry 410 may be mounted on a circuit board that may also hold memory device 412 and portions of communication interface 406 or user interface 408.

Executable instructions 416 may comprise computer programs, firmware, or some other form of machine-readable processing instructions. Executable instructions 416 may include communication module 418, and trivia module 420, although related operations may be handled by multiple different modules or programs (potentially located on multiple computing devices), all operations may be performed by a single module, or additional modules may be included in executable instructions 416. For example, elements or aspects of communication module 418 and trivia module 420 may be implemented by trivia service 102, synchronizer 130, trivia API 132, user device 104, streaming device 106, other systems, or a combination thereof. Executable instructions 416 may further include an operating system, utilities, drivers, network interfaces, applications, or other types of software. When executed by processing circuitry 410, executable instructions 416 may direct processing system 404 to operate computing system 402 as described herein.

Communication module 418 may be a set of instructions for establishing and maintaining persistent connections between player devices and the trivia service, such as via WebSocket connections or HTTPS communications via TCP/IP. Communication module 418 may handle sending or receiving messages between player devices and the trivia service, including traffic balancing and proper segregation of messages and data based on the corresponding communication channel (and therefore corresponding player). Communication module 418 may also handle network and communication security, such as by managing encryption and decryption, keys, or other access rights. In some examples, communication module 418 may correspond to WebSocket Manager 114.

Trivia module 420 may include a set of computer functions or instructions for managing the game flow and operations of the interactive trivia game. For example, trivia module 420 may handle scheduling and broadcasting of trivia game events according to the event schedule 414, logging and managing player content 422, verifying received answers, timestamps, scores, or a combination thereof, or other game operations. Trivia module 420 may also evaluate player data to determine dynamic events such as player or venue rivalries, answer streaks, leaderboard updates, etc.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g., steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:

implementing an interactive trivia game at a trivia service, including:

establishing a persistent network connection with a plurality of remote player devices participating in the interactive trivia game;

issuing trivia game events to the plurality of remote player devices simultaneously based on:

a local timing manager of the trivia service;

a schedule of trivia events; and verifying scores for the plurality of remote player devices based on the local timing manager by rejecting response timing values included in an answer message from a remote player device that fall outside a predefined latency threshold relative to the local timing manager, enabling synchronized and cheat-resistant play of the interactive trivia game by the plurality of remote player devices.

2. The method of claim 1 further comprising establishing the persistent network connection via a WebSocket API.

3. The method of claim 2 further comprising:

displaying join information enabling the plurality of remote player devices to establish a WebSocket connection to the trivia service.

4. The method of claim 3 further comprising:

implementing the local timing manager using a cron command line utility as a job scheduler configured to issue clock ticks at a fixed schedule; and checking the schedule of trivia events at each clock tick to determine whether a next trivia game event is scheduled to be issued.

5. The method of claim 4 further comprising:

issuing the trivia game events using data transfer objects (DTOs) including data the plurality of remote player devices are configured to execute using local instructions to implement a game flow.

6. The method of claim 5 further comprising:

receiving the answer message from the remote player device responsive to a question from the interactive trivia game, the answer message including a numerical value representing how quickly a user responded to the question; and verifying a score for the remote player device based on comparing the numerical value to an elapsed time measured by the local timing manager.

7. The method of claim 6 further comprising:

receiving a user input from a first remote player device including an indication of an action configured to impact a user interface of the interactive trivia game at a second remote player device; and sending a command to the second remote player device to execute the action.

8. A memory device storing instructions that, when executed, cause a processor to perform a method comprising:

implementing an interactive trivia game at a trivia service, including:

establishing a persistent network connection with a plurality of remote player devices participating in the interactive trivia game;

issuing trivia game events to the plurality of remote player devices simultaneously based on:

a local timing manager of the trivia service;

a schedule of trivia events; and verifying scores for the plurality of remote player devices by:

receiving, from a remote player device, an answer message including a response timing value;

comparing the response timing value against an elapsed time measured by the local timing manager, independent of any player-side clock; and rejecting a user response included in the answer message when the response timing value falls outside a predetermined timing tolerance relative to the elapsed time measured by the local timing manager, enabling synchronized and cheat-resistant play of the interactive trivia game by the plurality of remote player devices.

9. The memory device of claim 8 storing instructions that, when executed, cause the processor to perform the method further comprising:

establishing the persistent network connection via a WebSocket API.

10. The memory device of claim 9 storing instructions that, when executed, cause the processor to perform the method further comprising:

displaying join information enabling the plurality of remote player devices to establish a WebSocket connection to the trivia service.

11. The memory device of claim 8 storing instructions that, when executed, cause the processor to perform the method further comprising:

implementing the local timing manager using a cron command line utility as a job scheduler configured to issue clock ticks at a fixed schedule; and checking the schedule of trivia events at each clock tick to determine whether a next trivia game event is scheduled to be issued.

12. The memory device of claim 8 storing instructions that, when executed, cause the processor to perform the method further comprising:

issuing the trivia game events using data transfer objects (DTOs) including data the plurality of remote player devices are configured to execute using local instructions to implement a game flow.

13. The memory device of claim 8 storing instructions that, when executed, cause the processor to perform the method further comprising:

receiving the answer message from the remote player device responsive to a question from the interactive trivia game, the answer message including a numerical value representing how quickly a user responded to the question; and verifying a score for the remote player device based on comparing the numerical value to an elapsed time measured by the local timing manager.

14. The memory device of claim 8 storing instructions that, when executed, cause the processor to perform the method further comprising:

receiving a user input from a first remote player device including an indication of an action configured to impact a user interface of the interactive trivia game at a second remote player device; and sending a command to the second remote player device to execute the action.

15. A system comprising:

a trivia service configured to implement an interactive trivia game, including:

establish a persistent network connection with a plurality of remote player devices participating in the interactive trivia game;

issue trivia game events to the plurality of remote player devices simultaneously based on:

a local timing manager of the trivia service;

a schedule of trivia events; and verify scores for the plurality of remote player devices based on the local timing manager by rejecting response timing values included in an answer message from a remote player device that fall outside a predefined latency threshold relative to the local timing manager, enabling synchronized and cheat-resistant play of the interactive trivia game by the plurality of remote player devices.

16. The system of claim 15 comprising the trivia synchronizer further configured to:

establish the persistent network connection via a WebSocket API; and display join information enabling the plurality of remote player devices to establish a WebSocket connection to the trivia service.

17. The system of claim 15 comprising the trivia synchronizer further configured to:

implement the local timing manager using a cron command line utility as a job scheduler configured to issue clock ticks at a fixed schedule; and check the schedule of trivia events at each clock tick to determine whether a next trivia game event is scheduled to be issued.

18. The system of claim 15 comprising the trivia synchronizer further configured to:

issue the trivia game events using data transfer objects (DTOs) including data the plurality of remote player devices are configured to execute using local instructions to implement a game flow.

19. The system of claim 15 comprising the trivia synchronizer further configured to:

receive the answer message from the remote player device responsive to a question from the interactive trivia game, the answer message including a numerical value representing how quickly a user responded to the question; and verify a score for the remote player device based on comparing the numerical value to an elapsed time measured by the local timing manager.

20. The system of claim 15 comprising the trivia synchronizer further configured to:

receive a user input from a first remote player device including an indication of an action configured to impact a user interface of the interactive trivia game at a second remote player device; and send a command to the second remote player device to execute the action.

* * * * *